United States Patent [19]
Gasztonyi

[11] Patent Number: 5,339,445
[45] Date of Patent: Aug. 16, 1994

[54] METHOD OF AUTONOMOUSLY REDUCING POWER CONSUMPTION IN A COMPUTER SYTEM BY COMPILING A HISTORY OF POWER CONSUMPTION

[75] Inventor: Laszlo R. Gasztonyi, Penfield, N.Y.

[73] Assignee: Harris Corporation, Melbourne, Fla.

[21] Appl. No.: 977,030

[22] Filed: Nov. 16, 1992

[51] Int. Cl.5 .............................................. G06F 1/32
[52] U.S. Cl. ..................... 395/750; 364/707; 364/273.1; 364/273.2; 364/273.3; 364/DIG. 1
[58] Field of Search ............... 395/750, 650, 375, 575; 364/707, 492; 365/227; 307/34

[56] References Cited
U.S. PATENT DOCUMENTS

| | | | |
|---|---|---|---|
| 4,075,699 | 2/1978 | Schneider et al. | 364/492 |
| 4,171,539 | 10/1979 | Tawfik et al. | 395/750 |
| 4,203,153 | 5/1980 | Boyd | 395/750 |
| 4,663,539 | 5/1987 | Sharp et al. | 307/38 |
| 4,678,316 | 7/1987 | Abuyama | 355/314 |
| 4,698,748 | 10/1987 | Juzsurik et al. | 395/750 |
| 4,809,163 | 2/1989 | Hirosawa et al. | 395/750 |
| 4,851,987 | 7/1989 | Day | 395/550 |
| 4,980,836 | 12/1990 | Carter et al. | 364/483 |
| 5,017,799 | 5/1991 | Fishman | 307/34 |
| 5,167,024 | 11/1992 | Smith et al. | 395/375 |
| 5,218,704 | 6/1993 | Watts, Jr. et al. | 395/750 |
| 5,220,671 | 6/1993 | Yamagishi | 395/750 |
| 5,237,684 | 8/1993 | Record et al. | 395/650 |
| 5,293,632 | 3/1994 | Novakovich et al. | 395/750 |

Primary Examiner—Gopal C. Ray
Attorney, Agent, or Firm—Rogers & Killeen

[57] ABSTRACT

Power consumption in an electrical system, particularly a battery powered computer system, may be reduced by a method in which the performance of the system's power consuming assets (e.g., I/O devices, memory, processors, etc.) is monitored during the operation of application programs. The performance metrics (e.g., time on, processing assets, instruction density, etc.) for each of the application programs is stored in a look-up table below the application program software level that is accessible to the basic input/output system and/or disk operating system. The look-up table may be dynamically updated each time an application program is run. The data in the look-up table are used to remove all or part of the power from those assets that require no or less power during operation of a particular application program. The method is transparent to the application programs and may use a terminate and stay resident programs.

19 Claims, 2 Drawing Sheets

METHOD OF AUTONOMOUSLY REDUCING POWER CONSUMPTION IN A COMPUTER SYTEM BY COMPILING A HISTORY OF POWER CONSUMPTION

BACKGROUND OF THE INVENTION

The present invention relates to methods of reducing power consumption in electrical systems, and more particularly to methods of reducing power consumption in battery operated computer systems through the novel use of the history of power consumption for the programs that are in the computer system.

Electrical systems, particularly portable computer systems that are powered by a depletable power source (i.e., battery powered), such as lap top and notebook computers, have been developing rapidly. The developments add more and more capability to the systems, making them portable and attractive alternatives for conventionally powered computer systems of similar capability. However, increasing capability usually entails an increase in the drain of power from the computer system's power source. As more devices are operated, more memory is energized and/or newer devices consume more power than their predecessors. In systems where the power source is depletable, the lack of availability of a continuous supply of sufficient power to operate the computer system may place constraints on the types and numbers of improvements that may be added to the systems. Further, some of the programs operated, such as those used in imaging, may impose severe power retirements. The result may be that the useful life of the depletable power source may be only a few hours.

The construction and operation of computer systems is well known in the art. Computer systems typically include a number of power consuming assets such as input/output devices, memory, expansion cards, monitors, data cards, disk drives, processor units, and peripheral devices. Typically, each of these power consuming assets is connected or can be connected to the power source through a switchable medium.

In the prior art, power consumption has been reduced by using the passage of time to determine whether a power consuming asset is to be switched off (or have its power reduced). That is, if an asset is not used for a predetermined period of time, power to the asset is disconnected or decreased to reduce the overall power consumption of the computer system. A disadvantage of this approach is that all of the assets, even those that are not or will not be used, are on and consuming power for at least a predetermined period of time. Additionally, when a de-energized asset is subsequently needed, the system must often wait while the asset is powered, stabilized, and ready to perform its task.

In contrast, the present invention compiles a history of power consumption for each program used in a computer system so that historically unnecessary power consuming assets are not turned on, or placed in standby, when a computer program is operated. The history may also be used to predict when a standby asset will again be needed so that the asset may be energized sufficiently in advance so that it is ready when needed without delay.

Accordingly, it is an object of the present invention to provide a novel method of reducing power consumption in a computer system that obviates the problems of the prior art.

It is a further object of the present invention to provide a novel method of reducing power consumption using the history of power consumption for a previously run computer application program to disconnect or reduce power to power consuming devices when the application program is run again, or when segments or phases of the application program are run again.

It is still a further object of the present invention to provide a novel method of reducing power consumption while avoiding unnecessary delays in operation when a system's standby asset is again needed.

It is yet a further object of the present invention to provide a novel method of reducing power consumption in which profiles of the system's power consuming assets and their performance metrics are maintained in a look-up table in the computer system for subsequent use in load-shedding.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

In the method of present invention, a battery powered computer system operates a number of application programs, the computer system including a number of power consuming assets, one or more of which may function during operation of each of the application programs. The power consumption of each of the power consuming assets is monitored during operation of each of the application programs and recorded in a table in the computer system that maintains a profile of system resources required. Subsequently, when an application program, or a segment or phase thereof, is operated again, the profile of resources required is recalled from the table and used to automatically adjust the power being provided to the system's assets.

Figure 1:
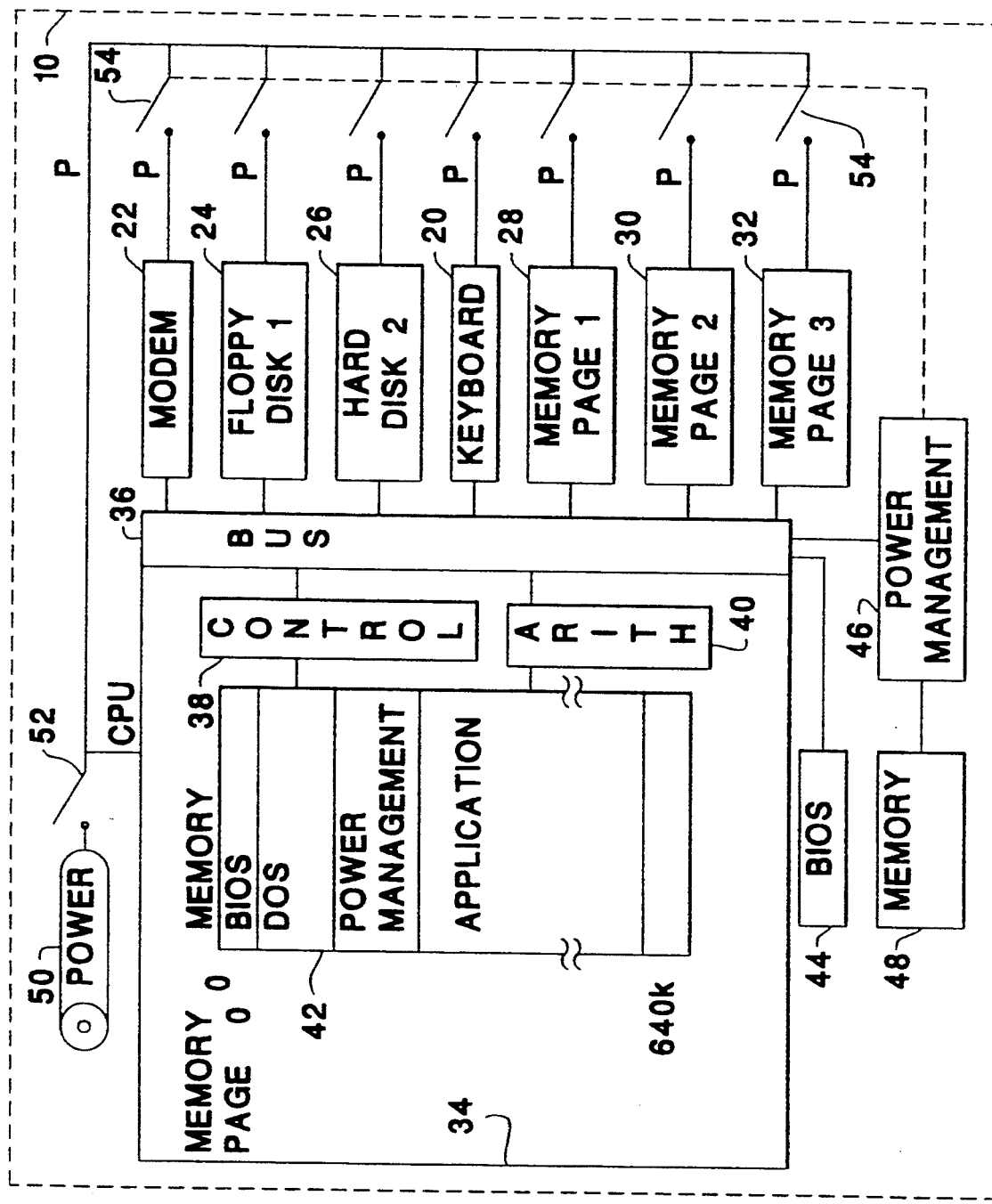
FIG. 1 is a block diagram of an embodiment of the present invention.

With reference to FIG. 1, a power management system of the present invention can be embodied in a conventional personal computer 10. The computer 10 may have conventional assets, including a keyboard 20, modulator/demodulator ("modem") 22, a floppy disk 24, a hard disk 26, and memory devices 28, 30, 32. As is well-known, these assets may communicate with a central processing units ("CPU") 34 through a conventional data bus 36. The CPU 34 may include a control unit 38 having addressing, instruction decode, and instruction performance capabilities, an arithmetic unit 40 for performing arithmetic operation on data and a central memory 42.

A basic input/out system ("BIOS") 44 may communicate with CPU 34 directly or (as shown) through the bus 36. Typically, the BIOS 44 will contain the computer instruction necessary to start the computing system along with instructions for operating the various assets in the computer 10.

A power management system 46 may also communicate with the CPU and the assets directly on through the bus 36 (as shown). The power management system 46 may also have associated with it a memory 48 for data and program storage.

The computer 10 also includes a source of electrical power 50, such as a battery, which is applied to each of the other elements of the computer 10 needing power through a master switch 52. The power is supplied through switched lines P to each of the assets. The operation of the switches 54 are controlled by the power management system 46.

In operation, the computer 10 operates in a conventional manner. At power-up, a starting program is read from the BIOS 44 into the CPU 34 and executed by the control unit 38. Typically, the BIOS program will read a larger, general central program such as the Disk Operating System ("DOS") from one of the disks 24, 26. Control of the CPU is given over to the DOS program by the BIOS program. A portion of the BIOS program may remain in CPU memory 42 in the form of data or instructions for communicating with the assets.

When a user wishes to execute an application program, generally the user keys a command into the keyboard 20 which is read by the DOS program. The DOS program automatically loads the specified application program into the CPU memory and relinquishes control of the CPU 34 to it. Usually, a portion of the DOS program remains in memory to assist the application program in utilizing the assets.

During execution of the application program, the power management system may monitor the usage of the various assets to determine functional and time relations between the usage of the assets and the execution of the application program. The power management system may store in its memory 48, these relations for each application program executed on the computer. The power management system may use any desired method for the accumulation of the various metrics. For example, the system can be loaded into the computer's memory and monitor the application program's calls to DOS and/or to BIOS. This monitoring can be done by being built into the DOS and BIOS asset handling routines or by trapping certain DOS and/or BIOS interrupts. Alternatively, the power management system may contain an independent microprocessor and may monitor traffic on the computer's bus 36. Generally, such traffic will contain data and commands to the various assets and the power management system 46 may learn of the sequence of use of the asset by the executing application program by monitoring the bus 36. In still another alternative, the power management system software could be loaded into the CPU memory 42 and be given control of the CPU 34 on a timed interrupt basis, such as through a terminate and stay resident (TSR) program. At each interrupt, the management system may query the various tables and other data maintained by DOS and/or BIOS to determine the activity status of the various assets. Each of the foregoing alternatives is non-exclusive and those skilled in the art could use one or more of these techniques, or others, to monitor asset utilization.

Once the computer 10 has obtained some measure of asset utilization of a particular application, the power management system may be used to control the power to some or all of the system assets. Using the data stored in previous executions of a particular application, the power management system can predict the utilization of the various assets by each application program, or a segment or phase thereof, and energize only the assets needed while they are actually needed. To avoid unnecessary failures of the application program in case an asset is unexpectedly needed and not powered, a TSR may issue an interrupt command, or the DOS or BIOS may be altered to wait until a recently powered asset is ready. Because the power management system updates its asset use prediction data each time the application is executed, the more times an application is executed the less likely will be undesired waits for assets to be ready.

The switches 54 may be any conventional switches, the operation of which can be controlled by another device. For some applications, switches may be ganged to operate together or may be automatically sequenced to operate in a predetermined manner. For example, the switches may be a stack of MOSFET switches operated by a processor that runs a TSR program.

The monitoring of power consumption in the present invention may include the monitoring of one or more performance metrics of the power consuming assets of the computer system. For example, the performance metrics may include the average time spent in an application program, the processing assets required to execute an application program, the instruction density of the software needed to execute an application program, the peripheral devices used in an application program, memory requirements, MIP of instructions, etc.

Power consumption data for each application program may be stored in the computer system, for example, in a look-up table (or in plural tables, one for each application program) so that the table may be accessed when an application program is run again. The table may be located in an appropriate area, such in BIOS or in a TSR. Further, the stored power consumption data may be updated each time the application program is run, for example, by replacing the previously recorded power consumption data with the new data, or combining the previous data with the new data to form a moving average or other relevant statistic.

The method of the present invention may be implemented by using a TSR that fires when DOS loads an application program. The TSR determines which application program is running and points to a table that BIOS uses to control power assets. The method may also be implemented by modifying the computer system's basic input/output system (BIOS) and by adding custom functionality to the computer system's disk operating system (DOS). The modified BIOS generates the data necessary to build a table that includes the performance metrics for each of the power consuming assets for each program that is run. When the computer program is run again, DOS accesses the table and uses the data therein to disconnect or reduce power to power consuming assets not used by the particular application program being operated. The data may indicate that the power consuming assets are merely to be put on standby at a reduced power consumption level. This action may be appropriate when the data in the table indicate that a particular power consuming asset is used infrequently by a particular application program. The table is maintained in the computer system at a level that is accessible to the BIOS and DOS. The method of the invention is desirably transparent to the application program.

Similarly, the system of the present invention may reenergize assets based on the stored data and/or on stored characteristics. For example, when a disk unit or an additional processor has been off and is to be turned on at time Y, the system may issue a command to reenergize the disk unit or processor at Y-Δ minutes, where Δ is the amount of time required by the unit to be ready to perform after power has been supplied.

The system of the present invention may also turn assets on or off depending on relationships among asset usage recognized by the power management system. For example, the system could recognize that a disk unit is accessed shortly after the input of data on a keyboard. Under this circumstance, the disk unit could be de-energized when not in use and automatically re-energized when input data is received on a keyboard so as to be ready when the computer wants to access the disk shortly thereafter.

Figure 2:
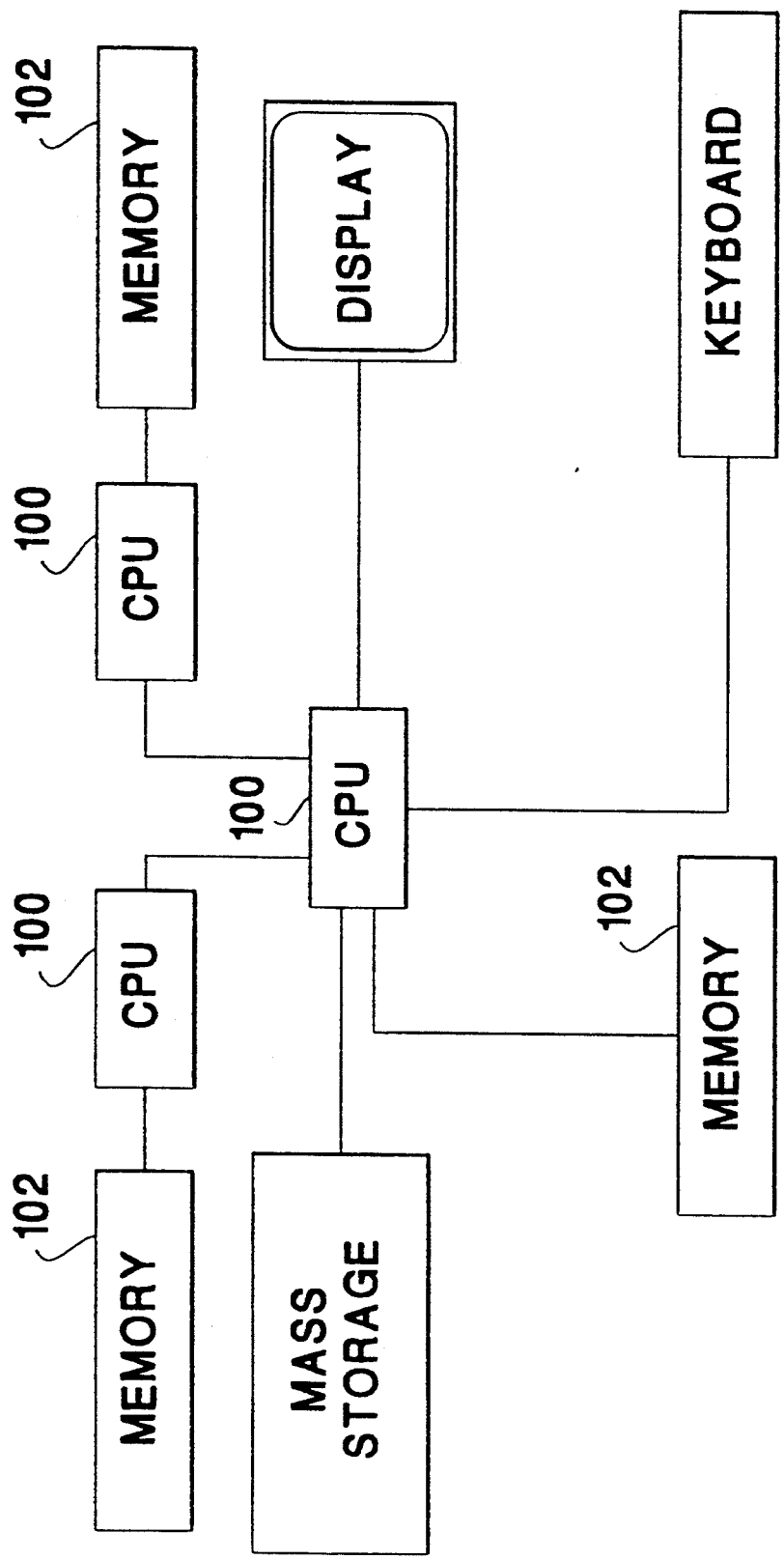
FIG. 2 is a block diagram of a multiple CPU system in which the present invention may find application.

With reference to FIG. 2, the present invention may be implemented in a system having multiple CPUs 100, each with its own memory unit 102. One of the CPUs 100 may include a mass storage 104 and interface devices such as a keyboard 106 and a display 108. The above-described method may turn off or reduce power to one or more of the CPUs 100, memory units 102, mass storage 104 and the interface devices.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A method of reducing power consumption in a battery powered computer system that operates a plurality of application programs, the computer system including a plurality of power consuming assets that may function during operation of an application program, the method comprising the steps of:
   a. monitoring the power consumption of the power consuming assets during a first operation of each of the application programs;
   b. recording the monitored power consumption of each of the power consuming assets for each of the application programs in a look-up table in the computer system;
   c. recalling the recorded power consumption of the power consuming assets for an application program from the look-up table for a subsequent operation of the application program; and
   d. automatically reducing power available to the power consuming assets in response to the recalled power consumption during the subsequent operation of the application program by reducing all or part of the power from those assets that require no or less power so that computer system power consumption may be reduced.

2. The method of claim 1 further comprising the step of updating the recorded power consumption for an application program when the application program is operated.

3. The method of claim 1 wherein the recorded power consumption is recalled in step c. before the application program is operated.

4. The method of claim 1 wherein the recorded power consumption is recalled in step c. when the application program is operating.

5. The method of claim 1 wherein the step of monitoring power consumption includes the monitoring of one or more of the performance metrics selected from the group consisting of time spent in an application program, processing assets required to execute an application program, instruction density of the software required to execute an application program and elements required to operate an application program.

6. A method of reducing power consumption in a computer system that operates a plurality of application programs, the computer system including a plurality of power consuming assets that may function during operation of an application program, the method comprising the steps of:
   a. monitoring the activity of the power consuming assets during the operation of the application programs;
   b. storing in a look-up table the power consuming assets for which power availability may be reduced during operation of each of the application programs;
   c. recalling during the subsequent operation the stored power consuming assets for an application program from the look-up table;
   d. automatically reducing power available to the recalled power consuming assets when the application program is operating by reducing all or part of the power from those assets that require no or less power so that computer system power consumption may be reduced;
   e. updating the identified power consuming assets for an application program when the application program is operated.

7. The method of claim 6 wherein said look-up table is in the computer system and is accessible by the computer system's basic input/output system or disk operating system.

8. The method of claim 6 wherein the identified power consuming assets are recalled in step c. before the application program is operated.

9. The method of claim 6 wherein the identified power consuming assets are recalled in step c. when the application program is operating.

10. The method of claim 6 where in step c. comprises the step of accessing said look-up table with a terminate and stay resident (TSR) program.

11. The method of claim 6 wherein the power consuming assets are selected from the group consisting of input/output devices, memory, expansion cards, monitors, disk drives, data cards, processors and peripheral devices.

12. In a method of load-shedding for a program operating in a computer system having power consuming elements, the method comprising the steps of:
   a. identifying the power consuming elements that may be shed when a program is operating a first time by monitoring their power consumption;
   b. automatically storing the identified power consuming elements in a table maintained in the computer system; and
   c. automatically shedding the identified power consuming elements when the program is operated again by reducing all or part of the power from those assets that require no or less power.

13. The method of claim 12 further comprising the step of accessing said table from the computer system's basic input/output system or disk operating system.

14. The method of claim 13 further comprising the step of updating the power consuming elements identified in said table for a program when the program is operated.

15. The method of claim 12 wherein the power consuming elements are selected from the group consisting of input/output devices, memory, expansion cards, monitors, disk drives, data cards, processors and peripheral devices.

16. The method of claim 12 wherein the step of identifying power consuming elements that may be shed includes the monitoring of one or more of the performance metrics selected from the group consisting of time spent in a program, processing assets required to execute a program, instruction density of the software required to execute a program and peripheral devices required to operate a program.

17. A method of load-shedding for a program operating in a computer system having power consuming elements, comprising the steps of:
   a. identifying the power consuming elements that may be shed when a program is operating a first time by monitoring their power consumption;
   b. storing the identified power consuming elements for the program in a table in the computer system; and
   c. automatically shedding the identified power consuming elements when the program is operated again by accessing the table from the computer system's basic input/output system or disk operating system and reducing all or part of the power from those assets that require no or less power.

18. The method of claim 17 further comprising the step of updating the power consuming elements identified in the table for a program when the program is operated.

19. A method of load-shedding for a program operating in a computer system having power consuming elements, comprising the steps of:
   a. identifying the power consuming elements that may be shed when a program is operating a first time by monitoring their power consumption;
   b. storing the identified power consuming elements for the program in a table in the computer system;
   c. automatically shedding the identified power consuming elements when the program is operated again by reducing all or part of the power from those assets that require no or less power; and
   d. updating the power consuming elements identified in the table for a program each time the program is operated.

* * * * *